Sept. 1, 1953 B. R. SHEPARD ET AL 2,651,007

ELECTRONIC APPARATUS AND METHOD OF MOUNTING

Filed Oct. 1, 1945

Inventors:
Billy R. Shepard,
Robert B. Crandell,
by Merton D. Morse
Their Attorney.

Patented Sept. 1, 1953 2,651,007

UNITED STATES PATENT OFFICE 2,651,007

ELECTRONIC APPARATUS AND METHOD OF MOUNTING

Billy R. Shepard and Robert B. Crandell, Schenectady, N. Y., assignors to General Electric Company, a corporation of New York Application October 1, 1945, Serial No. 619,721

3 Claims. (Cl. 317—101)

Figures 1, 2, 3, 4, 5, 6:
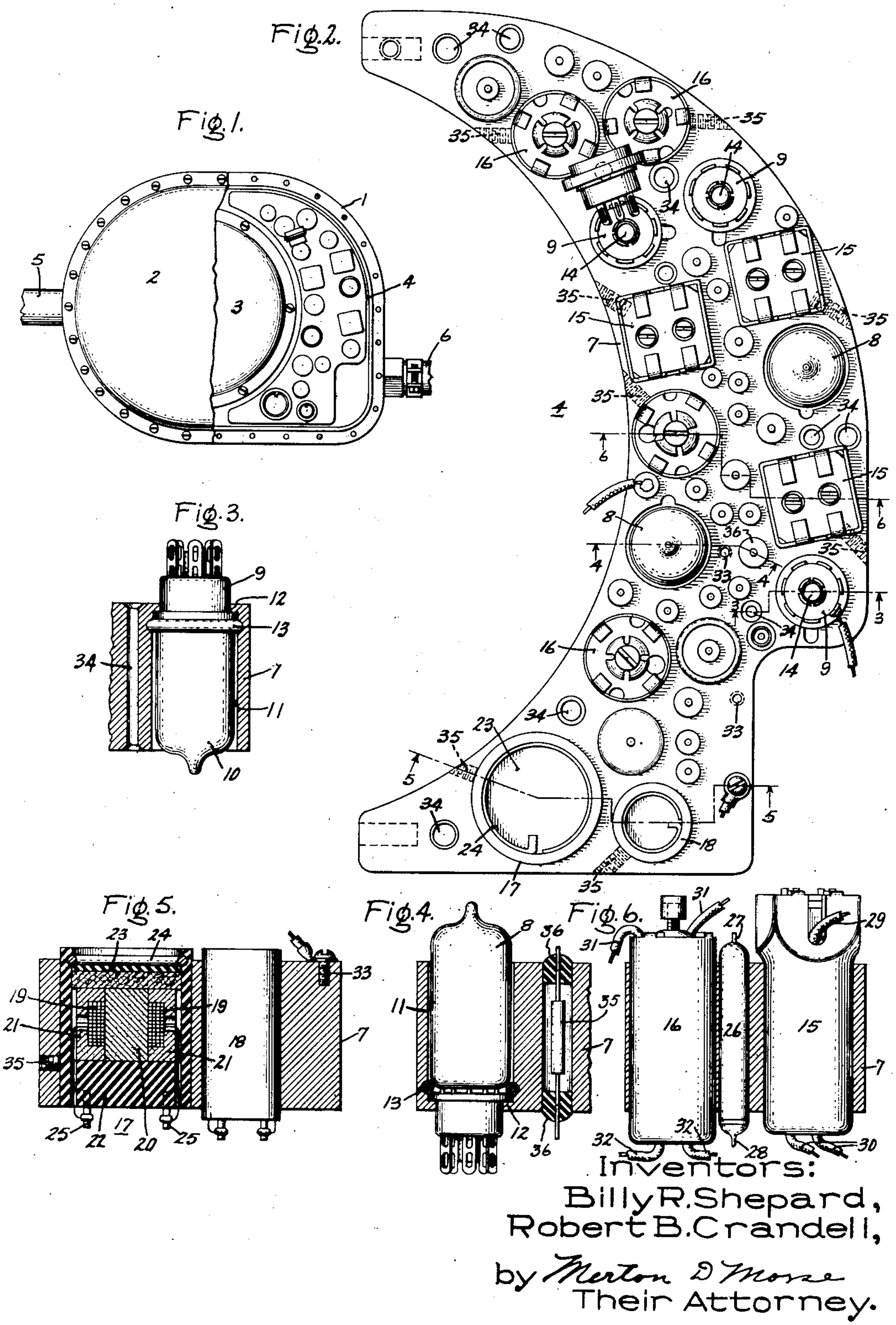

This invention relates to electronic apparatus and more particularly to the mounting of such apparatus to occupy a minimum space.

It sometimes becomes desirable to locate electronic amplifiers and similar apparatus in limited spaces or in small spaces of irregular contour. The limitations of the conventional methods of mounting are such that it is not possible to place the apparatus in some locations where substantial advantages would result. For example, in a device which employs a rotating receiver it is desirable to amplify the received signals before conducting them from the receiver to the stationary apparatus in order to avoid attenuation of weak signals before they can be amplified. At the same time it is also desirable to minimize the mass of the rotating mechanism, and large or heavy amplifier units become impractical for these applications. Accordingly it is an object of this invention to provide an improved method for mounting electronic apparatus.

It is another object of this invention to provide an electronic apparatus including an improved arrangement for mounting the apparatus in a small space.

It is another object of this invention to provide an electronic apparatus including an improved mounting and electrostatic shielding construction therefor.

The novel features which are believed to be characteristic of this invention are set forth with particularity in the appended claims. The invention itself, however, both as to its organization and method of operation, together with further objects and advantages thereof, may best be understood from the following description taken in connection with the accompanying drawing in which Fig. 1 represents a portion of a rotating receiving device provided with an electronic apparatus embodying this invention; Fig. 2 is an enlarged plan view of the amplifier shown in Fig. 1; Fig. 3 is a sectional view on the line 3—3 of Fig. 2; Fig. 4 is a sectional view on the line 4—4 of Fig. 2; Fig. 5 is a sectional view on line 5—5 of Fig. 2; and Fig. 6 is a sectional view on line 6—6 of Fig. 2.

Briefly the electronic apparatus illustrated in the drawing comprises a supporting metal block provided with holes or recesses extending therethrough on parallel axes and in which are arranged the several components of the circuit. Each of the components, such as the transformers, electronic tubes, and condensers, is made with a cylindrical form or casing so that the major portion thereof may be embedded in one of the recesses of the block. All the circuit connections can be made on one or the other of the faces of the block and all components can be arranged closely together. The metal block not only provides a rigid supporting structure for the apparatus but also provides effective electrostatic shielding for all the components thereof.

Referring now to the drawing, Fig. 1 represents a portion of the rotating receiving device of a high frequency receiver. This portion of the device includes a casing 1 having a cover 2 and enclosing a signal scanning device 3 and an electronic apparatus 4 comprising amplifiers and a converter. The receiving apparatus (not shown) is of the type including a plurality of signal elements which pick up signals from different sources. These signals are conducted to the scanner 3 through conductors arranged in a conduit 5. The operation of the scanner feeds the signals successively to the apparatus 4 which amplifies and converts the signals to an intermediate frequency and supplies them through a lead in an outlet conduit 6 to the stationary amplifying and detecting apparatus of the system (not shown). The scanner 3 is a motor-driven device which is made as small as possible in order to reduce the weight of the rotating parts of the receiving system, and it is also desirable that the housing 1 be made as small as possible. In the particular device shown the electronic apparatus 4 is fitted into a small space of irregular contour. In order to accomplish the reduction in size of the electronic apparatus such that it can be fitted into a small space, it is constructed as shown in Fig. 2.

The electronic apparatus 4, as shown in Figs. 1 and 2, comprises a rigid block 7. This block may be constructed of insulating material or of conducting material, the selection of material depending upon whether or not electrostatic shielding of the components of the apparatus is desired. In the construction illustrated, the block 7 is made of aluminum or aluminum alloy to provide a non-magnetic electrostatic shield of good conductivity and a supporting structure of light weight. In constructing the apparatus the block 7 is first cut to the contour of the space within the housing 1, the block being of a thickness such that the several components of the electric circuit can be embedded therein; the thickness of the block is clearly shown in Figs. 3 to 6, inclusive. The terminals of the several components are arranged so that each of the components has its terminals projecting beyond the face of the block. Some of the components, such as the electron discharge tubes, have all their terminals projecting beyond one face of the block while other components, such as the resistors, transformers and capacitors, are constructed with terminals at both ends so that one or more terminals project beyond one face of the block and the others beyond the other face thereof.

A complete description of the specific circuit connections is not believed necessary to an understanding of the invention and the connecting wires or conductors have therefore been omitted from the drawing so that the structural details of the assembly may be shown more clearly. In selecting the location of the various parts of the electronic circuit the larger components are spaced over the face area of the block so that they follow the general location of parts in the desired circuit; and the smaller components, such as the coupling resistors and capacitors, are located between the larger components and occupy spaces which would otherwise not be available for parts of the circuit other than wiring connections. In Fig. 2, two electron discharge devices or tubes 8 are indicated in upright positions. Three other tubes are included in the apparatus but are inverted so that only their bases 9 appear in Fig. 2. One of these inverted tubes is indicated at 10 in Fig. 3, the inverted base 9 being secured in a cylindrical recess 11 in the block against a shoulder 12, the base being retained in position by a snap ring 13. The tube 10 may be removed from the base by inserting small screw driver or rod through an opening 14 in the base 9 and pressing the tube away from the base. The upright tubes 8 are secured in the block 7 in the same manner as the inverted tubes 10, and in Fig. 4 corresponding parts for mounting the tubes 8 have been designated by the same numerals as applied to the tube 10 in Fig. 3.

The circuit also includes a plurality of capacity tuned coils or transformers 15 and a plurality of movable core or plug tuned inductance coils or transformers 16. Two choke coils are also shown in the drawing at 17 and 18 respectively. The choke coil 17 is shown in section in Fig. 5 where the coil may be seen at 19 fitted within a powdered iron core structure comprising a central core member 20 and two complementary cups 21 which enclose the coil 19. The choke coil is mounted in a suitable insulated cup 22 and is held in place by an insulated cover 23 and a snap ring 24. The terminal leads of the coil 19 extend through the bottom of the cup 22 and are secured to terminal posts 25.

One of each of the transformers 15 and 16 is shown in Fig. 6, together with a capacitor 26 having an upper terminal 27 and a lower terminal 28. The transformer 15 is provided with upper terminals 29 and lower terminals 30, and the transformer 16 is provided with upper terminals 31 and lower terminals 32. All these terminals extend beyond the upper and lower faces respectively of the block 7 and are available for making the necessary connections to provide the desired circuits. No attempt has been made to indicate the specific nature of the remaining components of the circuit, it being understood that various resistors and capacitors are necessary to complete the circuits of an electronic apparatus such as that illustrated. Ground connections, for example, can be made by fastening leads to the block 7 by screws fitted into threaded holes indicated at 33 one of which is shown in Fig. 5. It may be necessary to pass certain of the leads directly through the block 7, and drill holes, such as indicated at 34, may be employed for this purpose. Some of the components of the circuit, such as small resistors, may be shorter than the thickness of the block 7. One such resistor is shown at 35 in Fig. 4. Since the leads to these short components are flexible, it is desirable to prevent their rubbing against the edges of the blocks, and plugs 36 of rubber or other suitable insulating material are inserted in the recesses in which the short components are mounted. These plugs fit tightly and maintain the leads in the desired positions. In the mounting of these small components it may be desirable to make the recess, as shown, of greater diameter than the component since the plugs locate the component within the recess and elements such as resistors are not required to be grounded to the block 7.

In order to hold the several larger components securely in position, set screws 35 are employed which extend from the side of the block 7 directly against respective ones of the components as indicated, for example, in Fig. 5 where the choke coil 17 is held in place by a screw 35.

When the block 7 is constructed of metal, such as aluminum, it provides effective shielding for all the components embedded in the recesses of the block since the major portion of each of the components lies within the block. The amount and type of shielding may be varied by employing different materials for the block. All necessary wiring connections can be made adjacent the two flat surface areas of the block, and the lengths of critical leads such as certain control grid leads can be made a minimum. The entire assembly is thus mounted in a rigid structure which facilitates the handling of the electronic apparatus for servicing or replacement. It has been found that by the above described method of construction an electronic apparatus may be built to occupy only one-third to one-half the volume occupied by an apparatus of conventional construction.

While this invention has been described in connection with a particular form of electronic apparatus, various applications and arrangements will readily be apparent to those skilled in the art. It is, therefore, not desired that the invention be limited to the specific construction illustrated and described, and it is intended by the appended claims to cover all modifications which fall within the spirit and scope of the invention.

What we claim as new and desire to secure by Letters Patent of the United States is:

1. An electronic apparatus comprising a block composed of an electrostatic shielding metal having parallel faces on opposite sides thereof and a plurality of closely spaced recesses extending therethrough from one of said faces to the other, a plurality of diverse electric components of the apparatus each mounted and snugly fitted in a correspondingly dimensioned one of the recesses and having connecting terminals externally projecting adjacent at least one of said faces, said components being oriented to provide a plurality of terminals adjacent each of said faces with the terminals of the components in electrically associated circuits of said apparatus adjacent a respective one of said faces whereby the electrical circuit connections of associated circuits of the apparatus may be made between the terminals of the components adjacent each face area respectively, said block having a thickness of the order of the length of said components to provide an effective electrostatic shield between the components of said apparatus and between the connections on respectively opposite sides of said block, and also to provide a partially encasing breakage protecting supporting structure for said components.

2. An electronic apparatus comprising a nonmagnetic metal block having parallel faces on opposite sides thereof and having a plurality of closely spaced round holes extending therethrough from one of said faces to the other, a plurality of diverse electric components of said apparatus each having the major portion thereof cylindrical and of a length of the order of the thickness of said block between said faces, each of said components having the cylindrical portion thereof fitted within a respective one of said holes and having connecting terminals externally projecting adjacent at least one of said faces, said components being oriented to provide a plurality of terminals adjacent each of said faces with the terminals of components in electrically associated circuits of said apparatus adjacent a respective one of said faces whereby the electrical circuit connections of associated circuits of the apparatus may be made between the terminals of the components adjacent each parallel face of said block respectively, said block constituting an electrostatic shield for said components mounted therein and between the connections on respectively opposite sides of said block, and also constituting a partially encasing breakage protecting supporting structure for the apparatus.

3. An electronic apparatus comprising an aluminum block having parallel faces on opposite sides thereof and a plurality of closely spaced round holes of various diameters extending therethrough from one of said faces to the other, the holes of smaller diameter being interspersed intermediate the holes of larger diameter, a plurality of diverse electric components of said apparatus each having the major portion thereof cylindrical and of the length of the order of the thickness of said block between said faces, each of said components having the cylindrical portion thereof fitted within a respective one of said holes and having connecting terminals externally projecting adjacent at least one of said faces, said components being oriented to provide a plurality of terminals adjacent each of said faces with the terminals of components in electrically associated circuits adjacent a respective one of said faces whereby the electrical circuit connections of associated circuits of the apparatus may be made adjacent each face area respectively, said block constituting an electrostatic shield between the components mounted therein and between connections of electrically associated circuits on respectively opposite sides of said block, and also constituting a substantially completely encasing breakage protecting supporting structure for said components.

BILLY R. SHEPARD.
ROBERT B. CRANDELL.

References Cited in the file of this patent

UNITED STATES PATENTS

| Number | Name | Date |
|---|---|---|
| 562,564 | Allen | June 23, 1896 |
| 832,181 | Dean | Oct. 2, 1906 |
| 1,744,598 | Wait | Jan. 21, 1930 |
| 1,837,962 | Hensgen | Dec. 22, 1931 |
| 2,438,025 | Taliaferro | Mar. 16, 1948 |

FOREIGN PATENTS

| Number | Country | Date |
|---|---|---|
| 144,122 | Switzerland | Mar. 2, 1931 |